March 19, 1929.  J. W. WRIGHT  1,705,950
EGG OPENER
Filed Feb. 15, 1926
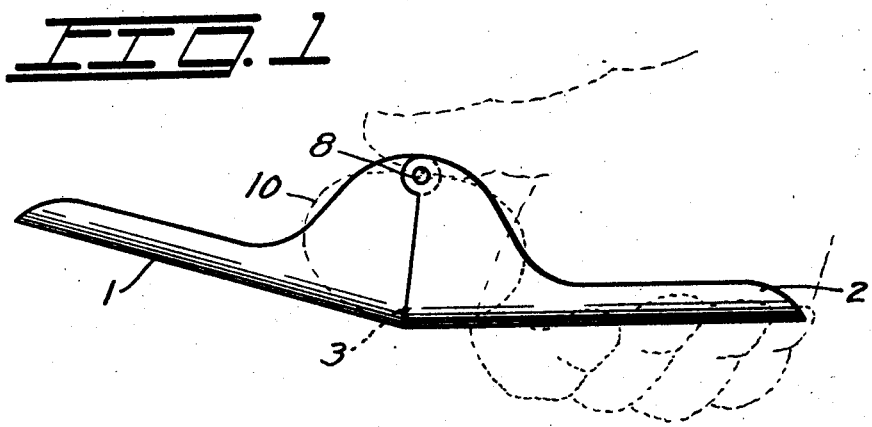
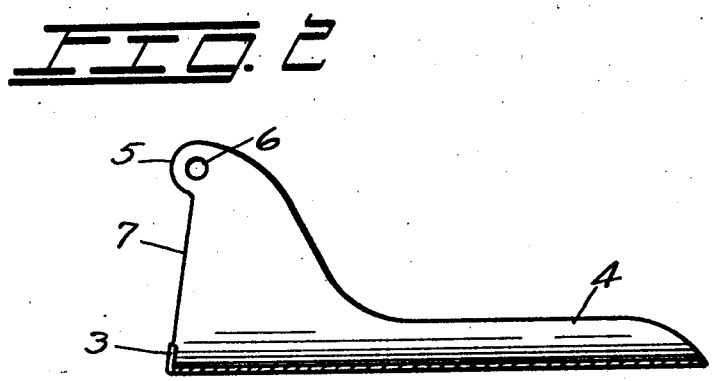
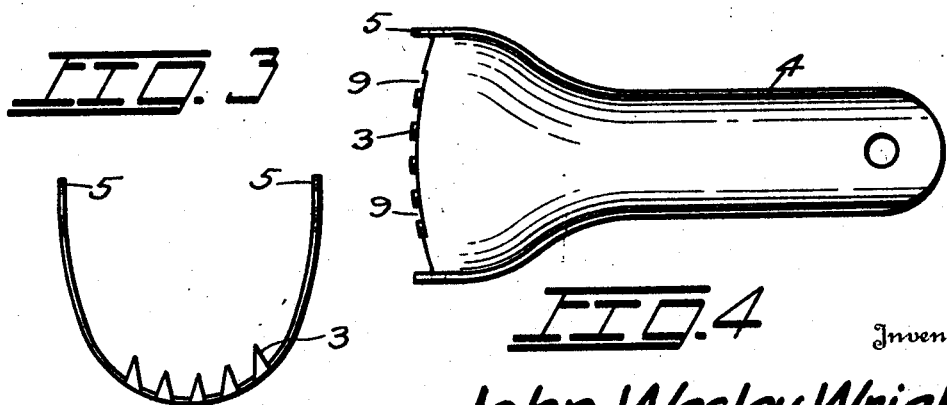
Inventor
John Wesley Wright
By Harry Bower
Attorney Patented Mar. 19, 1929.

1,705,950

UNITED STATES PATENT OFFICE.

JOHN WESLEY WRIGHT, OF PUYALLUP, WASHINGTON, ASSIGNOR OF ONE-HALF TO PERL MARION SNIDER, OF PUYALLUP, WASHINGTON.

EGG OPENER.

Application filed February 15, 1926. Serial No. 88,302.

The invention is a device for readily opening eggs by which it will be unnecessary to place the tips of the fingers in the egg to open it, and which will make it impossible to drop parts of the shell with the egg.

The object of the invention is to provide a simple and efficient device for opening eggs.

Another object of the invention is to provide a device for opening eggs which penetrates the shell and pulls the two halves of the egg apart so that the entire contents may drop without breaking the yolk.

A further object of the invention is to provide a device for readily opening eggs by which the egg may readily be held without danger of getting any of the contents on the fingers.

And a still further object of the invention is to provide a device for readily opening eggs which is of a simple and economical construction.

With these ends in view the invention embodies a device made in two halves with teeth in one end and means for hinging the two halves together, and in which both of the said halves may be made from the same die.

Other features and advantages of the invention will appear from the following description taken in connection with the drawings, wherein:—

Figure 1 is a side elevation of the device showing it as it would appear in use.

Figure 2 is a longitudinal section through one of the halves of the device.

Figure 3 is an end view looking toward the inner end of one of the halves of the device.

Figure 4 is a plan view of one of the halves of the device.

In the drawings the device is shown as it would be made wherein numeral 1 indicates one of the halves, numeral 2 the other of the halves, and numeral 3 the prongs.

Each of the halves 1 and 2 is made as shown in Figures 2, 3 and 4 with a narrow portion adjacent to one end by which it may be gripped and which is indicated by the numeral 4, and a curved portion at the opposite end which is curved as shown in Figure 3 and which is provided with ears 5 with openings 6 in them at their upper outer corners. This end is made on a slanting line 7 as shown in Figure 2 so that as the two sections are placed together and held in the position shown in Figure 1 these ends will come together before the backs of the halves arrive at a straight line so that the backs will form an obtuse angle which is a little less than 180 degrees. The two sections are pivotally hinged together by pins 8 through the openings 6, and it will be observed that the ears on one of the halves may be placed inside of the ears on the other of the halves.

The teeth 3 are made as shown and it will be observed that they are positioned so that as the two halves are placed together the teeth on one of the halves will come between the teeth on the other of the halves, and the ends of the halves are provided with notches 9 into which the teeth will fit so that the slanting edges 7 will come together to make a substantially sealed joint. It will also be noted that the teeth 3 are formed so that the plane of the lines 7 will pass through the centers of the teeth so that only half of each tooth will protrude into the notch 9 of the other half so that the notches will only be as deep as one-half of a tooth. It will also be noted that the edge of the central tooth is formed on the center line of the device so that when the other half is placed in position this edge of the central tooth on the other half will also be on the center line of the device. The teeth are also formed so that a line that may be drawn through their centers will extend radially outward when the material from which the device is stamped is flat, and so that the same line will be parallel to the center line when the device is formed and the teeth bent up as shown in Figure 3.

It will be understood that changes may be made in the construction without departing from the spirit of the invention. One of which changes may be in the design of either of the halves of the device, another may be in the design or arrangement of the teeth, and still another may be in the use of other means for hinging the two halves together.

The construction will be readily understood from the foregoing description. To use the device an egg may be placed in the top of the U-shaped channel formed between the hinged parts of the two members when the parts are closed as shown in Figure 1 with the egg positioned as indicated by the numeral 10, and the device with the egg may be gripped as indicated by the dotted lines in Figure 1, and it will be observed that as the center of the device is slightly tapped upon a solid object the teeth 3 will be forced into the egg and then as the opposite half of the device is moved upward the teeth in each half will draw the egg shell apart and permit the entire contents to drop into any suitable container. It will therefore be observed that the egg may readily be removed from the shell without breaking the yolk, placing the tips of the fingers into the egg or permitting any of the egg whatever, to get on the hands.

Having thus fully described the invention, what I claim as new and desire to secure by Letters Patent, is:—

In an egg opener of the class described, two substantially semi-circular pieces of material hinged at their abutting ends forming a U-shaped channel with the upper side open with the parts closed together, the outer ends of the said pieces of material being somewhat narrower and forming handles, and upwardly extending and overlapping staggered teeth at the inner ends of the said pieces of material.

In testimony whereof he affixes his signature.

JOHN WESLEY WRIGHT.